(12) United States Patent
Yoeli (10) Patent No.: US 8,342,441 B2
(45) Date of Patent: Jan. 1, 2013

(54) VTOL VEHICLE WITH COAXIALLY TILTED OR TILTABLE ROTORS

(75) Inventor: Raphael Yoeli, Tel-Aviv (IL)

(73) Assignee: Urban Aeronautics Ltd., Yavne (IL)

( * ) Notice: Subject to any disclaimer, the term of this patent is extended or adjusted under 35 U.S.C. 154(b) by 550 days.

(21) Appl. No.: 12/549,872

(22) Filed: Aug. 28, 2009

(65) Prior Publication Data
US 2010/0051740 A1 Mar. 4, 2010

Related U.S. Application Data

(60) Provisional application No. 61/136,381, filed on Sep. 2, 2008.

(51) Int. Cl.
*B64C 15/12* (2006.01)
(52) U.S. Cl. ............ 244/12.4; 244/17.11; 244/12.1; 244/12.2; 244/17.23; 244/17.25
(58) Field of Classification Search ............ 244/17.11, 244/6, 7 R, 7 B, 7 A, 12.1–12.5, 71.23, 17.25
See application file for complete search history.

(56) References Cited

U.S. PATENT DOCUMENTS

| | | | |
|---|---|---|---|
| 1,287,076 A | 12/1918 | Moses | |
| 2,077,471 A | 4/1937 | Fink | |
| 2,138,999 A | 12/1938 | Clark | |
| 2,242,201 A | 5/1941 | Woods | |
| 2,273,724 A | 2/1942 | Nelson et al. | |
| D155,004 S | 8/1949 | Gluhareff | |
| 2,709,947 A | 6/1955 | Woods | |
| 2,734,705 A | 2/1956 | Robertson | |
| 2,777,649 A | 1/1957 | Williams | |
| 2,812,636 A | 11/1957 | Kadosch et al. | |
| 2,899,149 A | 8/1959 | Breguet | |
| 2,930,544 A | 3/1960 | Howell | |
| 2,936,969 A | 5/1960 | Griffith et al. | |
| 2,939,649 A | 6/1960 | Shaw | |
| 2,951,661 A | 9/1960 | Dorman et al. | |
| 2,955,780 A | 10/1960 | Hulbert | |
| 2,968,453 A | 1/1961 | Bright | |
| 2,973,921 A | 3/1961 | Price | |
| 2,975,676 A | 3/1961 | Butler | |

(Continued)

FOREIGN PATENT DOCUMENTS

EP 0 236583 9/1987

(Continued)

OTHER PUBLICATIONS

Written Opinion and International Search Report of the International Searching Authority in International Application No. PCT/IB09/55656 (now WO 2010-067325 A2) mailed Sep. 30, 2010.

(Continued)

*Primary Examiner* — Isam Alsomiri
*Assistant Examiner* — Justin Benedik
(74) *Attorney, Agent, or Firm* — Nixon & Vanderhye, P.C.

(57) ABSTRACT

A VTOL vehicle includes a forward rotor, an aft rotor and a fuselage, the forward and aft rotor lying in a longitudinal axis of the vehicle, with the fuselage located axially between the forward and aft rotors. The vehicle has an in-flight configuration wherein the forward rotor is tilted downwardly at a negative tilt angle relative to the fuselage and the aft rotor is tilted upwardly at a positive tilt angle relative to the fuselage.

9 Claims, 11 Drawing Sheets

U.S. PATENT DOCUMENTS

| | | | |
|---|---|---|---|
| 2,988,301 A | 6/1961 | Fletcher | |
| 3,033,493 A | 5/1962 | Wilde et al. | |
| 3,039,537 A | 6/1962 | Heidelberg | |
| 3,082,977 A | 3/1963 | Arlin | |
| 3,088,695 A | 5/1963 | Clark | |
| 3,090,581 A | 5/1963 | Einarsson | |
| 3,116,898 A | 1/1964 | Clark et al. | |
| 3,136,500 A | 6/1964 | Kerry | |
| 3,139,244 A | 6/1964 | Bright | |
| 3,161,374 A | 12/1964 | Allred et al. | |
| 3,167,273 A | 1/1965 | Calderon | |
| 3,174,573 A | 3/1965 | Chaplin | |
| 3,179,353 A | 4/1965 | Peterson | |
| 3,179,354 A | 4/1965 | Alvarez-Calderon | |
| 3,181,810 A | 5/1965 | Olson | |
| 3,184,183 A | 5/1965 | Piasecki | |
| 3,187,817 A | 6/1965 | Colley | |
| 3,198,082 A | 8/1965 | Kerris | |
| 3,201,067 A | 8/1965 | Meyerhoff | |
| 3,203,645 A | 8/1965 | Shaw | |
| 3,223,354 A | 12/1965 | Seibold et al. | |
| 3,224,712 A | 12/1965 | Taylor et al. | |
| 3,231,221 A | 1/1966 | Platt | |
| 3,244,246 A | 4/1966 | Weiland | |
| 3,259,343 A * | 7/1966 | Roppel | 244/53 R |
| 3,262,511 A | 7/1966 | Carr | |
| 3,262,657 A | 7/1966 | Anker-Holth | |
| 3,265,329 A | 8/1966 | Postelson-Apostolescu | |
| 3,276,528 A | 10/1966 | Tucknott et al. | |
| 3,289,977 A | 12/1966 | Staats | |
| 3,350,035 A * | 10/1967 | Schlieben | 244/7 R |
| 3,360,217 A * | 12/1967 | Trotter | 244/12.4 |
| 3,383,074 A | 5/1968 | Coplin | |
| 3,384,327 A | 5/1968 | Postelson-Apostolescu | |
| 3,397,852 A | 8/1968 | Katzen | |
| 3,397,854 A | 8/1968 | Reyle | |
| 3,454,238 A | 7/1969 | Goodson | |
| 3,463,420 A | 8/1969 | Butler et al. | |
| 3,481,559 A | 12/1969 | Postelson-Apostolescu | |
| 3,519,224 A | 7/1970 | Boyd et al. | |
| 3,559,921 A | 2/1971 | Timperman | |
| 3,580,530 A | 5/1971 | Wada | |
| 3,584,810 A | 6/1971 | Velton | |
| 3,606,208 A | 9/1971 | Postelson-Apostolescu | |
| 3,614,030 A | 10/1971 | Moller | |
| 3,627,235 A | 12/1971 | Lippisch | |
| 3,633,849 A * | 1/1972 | Kling | 244/12.2 |
| 3,665,809 A | 5/1972 | Darlington et al. | |
| 3,713,748 A | 1/1973 | Langley | |
| 3,752,417 A | 8/1973 | Lagace | |
| 3,827,527 A | 8/1974 | Bertelsen | |
| 3,873,049 A | 3/1975 | Horsdal | |
| 3,904,155 A | 9/1975 | Chavis | |
| 3,912,201 A | 10/1975 | Bradbury | |
| 3,955,780 A | 5/1976 | Postelson | |
| 3,972,490 A | 8/1976 | Zimmermann et al. | |
| 4,022,405 A | 5/1977 | Peterson | |
| 4,043,421 A | 8/1977 | Smith | |
| 4,071,207 A * | 1/1978 | Piasecki et al. | 244/23 D |
| 4,149,688 A | 4/1979 | Miller, Jr. | |
| 4,171,784 A | 10/1979 | Eickmann | |
| 4,194,707 A | 3/1980 | Sharpe | |
| 4,469,294 A | 9/1984 | Clifton | |
| 4,505,442 A | 3/1985 | Kirsch et al. | |
| 4,505,443 A | 3/1985 | Bradfield et al. | |
| 4,537,372 A * | 8/1985 | Forizs | 244/12.4 |
| 4,598,890 A | 7/1986 | Herzog et al. | |
| 4,701,602 A | 10/1987 | Schaefer et al. | |
| 4,754,940 A | 7/1988 | Deter | |
| 4,757,962 A | 7/1988 | Grant | |
| 4,765,568 A | 8/1988 | Carl et al. | |
| 4,795,111 A | 1/1989 | Moller | |
| 4,796,836 A | 1/1989 | Buchelt | |
| 4,824,048 A | 4/1989 | Kim | |
| 4,828,203 A | 5/1989 | Clifton et al. | |
| 4,834,319 A | 5/1989 | Ewy et al. | |
| 4,856,732 A | 8/1989 | Eickmann | |
| 4,880,071 A | 11/1989 | Tracy | |
| 4,892,274 A | 1/1990 | Pohl et al. | |
| 4,917,332 A | 4/1990 | Patterson, Jr. | |
| 4,934,629 A | 6/1990 | Brant | |
| 4,982,914 A * | 1/1991 | Eickmann | 244/56 |
| 5,064,143 A | 11/1991 | Bucher | |
| 5,101,927 A | 4/1992 | Murtuza | |
| 5,209,428 A | 5/1993 | Bevilaqua et al. | |
| 5,297,761 A | 3/1994 | Kendall, Jr. et al. | |
| 5,303,879 A * | 4/1994 | Bucher | 244/23 C |
| 5,395,073 A * | 3/1995 | Rutan et al. | 244/48 |
| 5,419,514 A * | 5/1995 | Ducan | 244/12.4 |
| 5,454,531 A | 10/1995 | Melkuti | |
| 5,505,407 A | 4/1996 | Chiappetta | |
| 5,666,483 A | 9/1997 | McClary | |
| 5,738,302 A | 4/1998 | Freeland | |
| 5,746,390 A | 5/1998 | Chiappetta et al. | |
| 5,806,805 A | 9/1998 | Elbert et al. | |
| 5,890,441 A | 4/1999 | Swinson et al. | |
| 6,050,520 A | 4/2000 | Kirla | |
| 6,089,501 A | 7/2000 | Frost | |
| 6,105,901 A | 8/2000 | Ulanoski et al. | |
| 6,119,985 A | 9/2000 | Clapp et al. | |
| 6,170,778 B1 | 1/2001 | Cycon et al. | |
| 6,254,032 B1 | 7/2001 | Bucher | |
| 6,270,038 B1 | 8/2001 | Cycon et al. | |
| 6,318,668 B1 | 11/2001 | Ulanoski et al. | |
| 6,371,406 B1 | 4/2002 | Corcoran | |
| 6,382,559 B1 | 5/2002 | Sutterfield et al. | |
| 6,402,088 B1 * | 6/2002 | Syrovy et al. | 244/10 |
| 6,431,494 B1 | 8/2002 | Kinkead et al. | |
| 6,446,911 B1 | 9/2002 | Yount et al. | |
| 6,457,670 B1 | 10/2002 | Geranio | |
| 6,464,166 B1 | 10/2002 | Yoeli | |
| 6,474,598 B2 | 11/2002 | Carter, Jr. | |
| 6,520,449 B2 | 2/2003 | Illingworth | |
| 6,561,456 B1 | 5/2003 | Devine | |
| 6,568,630 B2 | 5/2003 | Yoeli | |
| 6,616,094 B2 | 9/2003 | Illingworth | |
| 6,644,598 B2 | 11/2003 | Glezer et al. | |
| 6,648,270 B1 | 11/2003 | Carter et al. | |
| 6,704,624 B2 | 3/2004 | Ortega et al. | |
| 6,708,920 B2 | 3/2004 | Fukuyama | |
| 6,745,977 B1 * | 6/2004 | Long et al. | 244/2 |
| 6,751,530 B2 | 6/2004 | Seifert et al. | |
| D496,606 S | 9/2004 | Sanders, Jr. | |
| 6,808,140 B2 | 10/2004 | Moller | |
| 6,817,570 B2 * | 11/2004 | Yoeli | 244/12.1 |
| 6,824,095 B2 | 11/2004 | Mao | |
| 6,834,832 B2 | 12/2004 | Jamgarov | |
| 6,843,447 B2 | 1/2005 | Morgan | |
| 6,883,748 B2 | 4/2005 | Yoeli | |
| 6,886,776 B2 | 5/2005 | Wagner et al. | |
| 6,892,979 B2 | 5/2005 | Milde | |
| 6,892,980 B2 | 5/2005 | Kawai | |
| 6,913,226 B2 | 7/2005 | Huynh | |
| 6,926,322 B2 | 8/2005 | Browne et al. | |
| 6,974,105 B2 | 12/2005 | Pham | |
| 7,246,769 B2 * | 7/2007 | Yoeli | 244/23 B |
| 7,249,732 B2 * | 7/2007 | Sanders et al. | 244/23 A |
| 7,267,300 B2 | 9/2007 | Heath et al. | |
| 7,275,712 B2 | 10/2007 | Yoeli | |
| 7,717,368 B2 | 5/2010 | Yoeli | |
| 7,789,342 B2 | 9/2010 | Yoeli | |
| 7,806,362 B2 | 10/2010 | Yoeli | |
| 7,857,253 B2 * | 12/2010 | Yoeli | 244/12.3 |
| 7,918,416 B2 | 4/2011 | Yoeli | |
| 7,946,528 B2 | 5/2011 | Yoeli | |
| 8,020,804 B2 | 9/2011 | Yoeli | |
| 8,066,220 B2 | 11/2011 | Kirstein | |
| 2002/0060267 A1 | 5/2002 | Yavnai | |
| 2002/0161488 A1 | 10/2002 | Guillemin et al. | |
| 2003/0038213 A1 | 2/2003 | Yoeli | |
| 2003/0062442 A1 | 4/2003 | Milde, Jr. | |
| 2003/0062443 A1 | 4/2003 | Wagner et al. | |
| 2003/0080242 A1 * | 5/2003 | Kawai | 244/12.4 |
| 2003/0085319 A1 | 5/2003 | Wagner et al. | |
| 2003/0127559 A1 | 7/2003 | Walmsley | |
| 2003/0195673 A1 | 10/2003 | Foch et al. | |
| 2004/0026563 A1 | 2/2004 | Moller | |

| | | | |
|---|---|---|---|
| 2004/0104303 | A1 | 6/2004 | Mao |
| 2004/0149857 | A1 | 8/2004 | Yoeli |
| 2004/0155143 | A1 | 8/2004 | Yoeli |
| 2005/0029407 | A1 | 2/2005 | Pohl et al. |
| 2005/0040283 | A1 | 2/2005 | Frazer |
| 2005/0065669 | A1 | 3/2005 | Roux et al. |
| 2005/0109875 | A1 | 5/2005 | Ouellette et al. |
| 2005/0178881 | A1 | 8/2005 | Yoeli |
| 2005/0242231 | A1 | 11/2005 | Yoeli |
| 2006/0113426 | A1 | 6/2006 | Yoeli |
| 2006/0226281 | A1* | 10/2006 | Walton ............... 244/17.23 |
| 2006/0231675 | A1 | 10/2006 | Bostan |
| 2007/0034734 | A1 | 2/2007 | Yoeli |
| 2007/0034739 | A1* | 2/2007 | Yoeli ............... 244/23 R |
| 2007/0095971 | A1 | 5/2007 | Yoeli |
| 2007/0158494 | A1 | 7/2007 | Burrage |
| 2008/0054121 | A1* | 3/2008 | Yoeli ............... 244/12.1 |
| 2008/0142643 | A1 | 6/2008 | Yoeli |
| 2008/0283673 | A1 | 11/2008 | Yoeli |
| 2009/0084907 | A1 | 4/2009 | Yoeli |
| 2009/0140102 | A1 | 6/2009 | Yoeli |
| 2009/0159757 | A1 | 6/2009 | Yoeli |
| 2010/0051753 | A1 | 3/2010 | Yoeli |
| 2010/0076625 | A1 | 3/2010 | Yoeli |
| 2010/0270419 | A1 | 10/2010 | Yoeli |
| 2011/0042509 | A1* | 2/2011 | Bevirt et al. ............... 244/12.4 |
| 2011/0042510 | A1* | 2/2011 | Bevirt et al. ............... 244/12.4 |
| 2011/0049306 | A1 | 3/2011 | Yoeli |
| 2011/0049307 | A1 | 3/2011 | Yoeli |
| 2011/0168834 | A1* | 7/2011 | Yoeli ............... 244/12.3 |
| 2011/0174920 | A1 | 7/2011 | Yoeli |
| 2012/0080564 | A1 | 4/2012 | Yoeli |

FOREIGN PATENT DOCUMENTS

| | | |
|---|---|---|
| EP | 0 553490 | 8/1993 |
| EP | 0 922925 | 6/1999 |
| GB | 935884 | 9/1963 |
| GB | 951186 | 3/1964 |
| IT | 666076 A | 8/1964 |
| SE | 184314 | 6/1963 |
| WO | 01/93039 A1 | 12/2001 |
| WO | 02/096750 A2 | 12/2002 |
| WO | 02/098732 A2 | 12/2002 |
| WO | 03/016134 A1 | 2/2003 |
| WO | 2004/012993 A1 | 2/2004 |
| WO | 2004/031876 A1 | 4/2004 |
| WO | 2004/065208 A2 | 8/2004 |
| WO | 2005/039972 A2 | 5/2005 |
| WO | 2006/072960 A2 | 7/2006 |
| WO | 2006/131920 | 12/2006 |
| WO | 2007/052271 A2 | 5/2007 |
| WO | 2007/099543 A2 | 9/2007 |
| WO | 2007/129313 A2 | 11/2007 |
| WO | 2008/065654 A2 | 6/2008 |
| WO | 2008/065664 A2 | 6/2008 |
| WO | 2008/135973 A2 | 11/2008 |
| WO | 2009/077968 A2 | 6/2009 |
| WO | 2009/147630 A1 | 12/2009 |
| WO | 2010/026517 A2 | 3/2010 |
| WO | 2010/067325 A2 | 6/2010 |

OTHER PUBLICATIONS

U.S. Appl. No. 12/938,444, (Yoeli) filed Nov. 3, 2010.
U.S. Appl. No. 12/989,533, (Yoeli) filed Oct. 25, 2010.
Written Opinion and International Search Report of the International Searching Authority in International Application No. PCT/IB09/053768 (Yoeli) (now WO 2010-026517 A2) dated Mar. 3, 2010.
U.S. Appl. No. 13/071,858, (Yoeli) filed Mar. 25, 2011.
U.S. Appl. No. 12/747,830, (Yoeli) filed Jun. 11, 2010.
U.S. Appl. No. 13/252,278 (Yoeli), filed Oct. 4, 2011.
Edward D. Flinn, "Revolutionary X-Hawk Hovers Near Success," Aerospace America, Jul. 2003, pp. 26-28.
Raymond L. Robb, "Driving on Air: 20$^{th}$ Century Flying Carpets," Vertiflite, vol. 51, No. I, Spring 2005, pp. 2-11.
Urban Aeronautics Ltd., "The X-Hawk VTOL Utility Vehicle"— product description and specifications, 2004.
Piasecki Aircraft Corporation Product Description and History for Piasecki VZ-8 VTOL research vehicle (undated).
De Lorean DMC-12, alleged to have first been produced in 1981 (images available from Wikipedia, the free encyclopedia, at http://en.wikipedia.org/wiki/De_Lorean_DMC-12).
International Search Report for International Application No. PCT/IL02/00417 (now WO 02/096750), dated May 23, 2003, published Oct. 2, 2003.
Written Opinion in International Application No. PCT/IL02/00417 (now WO 02/096750), Aug. 19, 2003.
International Preliminary Examination Report for International Application No. PCT/IL02/00417 (now WO 02/096750), Oct. 20, 2003.
Corrected International Preliminary Examination Report for International Application No. PCT/IL02/00417 (now WO 02/096750), Jul. 25, 2004.
International Search Report for International Application No. PCT/IL02/000439 (now WO 2002/098732), dated Apr. 28, 2003, published Mar. 18, 2004.
International Preliminary Examination Report in International Application No. PCT/IL02/000439 (now WO 2002/098732), Jul. 26, 2004.
International Search Report for International Application No. PCT/IL02/00682 (now WO 03/016134 (Yoeli)), dated Dec. 6, 2002.
International Search Report for International Application No. PCT/IL03/00640 (now WO 2004/012993 (Yoeli)), dated Jan. 2, 2004.
International Search Report for International Application No. PCT/IL03/00786 (now WO 2004/031876), Feb. 9, 2004.
International Search Report for International Application No. PCT/IL04/00984 (now WO 2005/039972 (Yoeli)), dated Dec. 6, 2005, published Jan. 26, 2006.
Written Opinion of the International Searching Authority in International Application No. PCT/IL04/00984 (now WO 2005/039972 (Yoeli)), dated Dec. 6, 2005.
International Preliminary Report on Patentability in International Application No. PCT/IL04/00984 (now WO 2005/039972 (Yoeli)), dated May 1, 2006.
Written Opinion/Search Report of the International Searching Authority in International Application No. PCT/IL06/00032 (now WO 2006/072960 (Yoeli)), dated Sep. 11, 2006.
International Preliminary Report on Patentability in International Application No. PCT/IL06/00032 (now WO 2006/072960 (Yoeli)), dated Sep. 11, 2006.
International Search Report for International Application No. PCT/IL06/00663 (now WO 2006/131920) (Yoeli) dated Dec. 19, 2006.
Written Opinion of the International Searching Authority in International Application No. PCT/IL06/00663 (now WO 2006/131920) (Yoeli) dated Dec. 19, 2006.
International Search Report for International Application No. PCT/IL06/01264 (now WO 2007/052271 A2) (Yoeli) dated Aug. 5, 2008.
Written Opinion of the International Searching Authority in International Application No. PCT/IL06/01264 (now WO 2007/052271 A2) (Yoeli) dated Aug. 5, 2008.
Written Opinion and Search Report of the International Searching Authority in International Application No. PCT/IL07/00271 (now WO 2007/099543 A2) (Yoeli) dated Oct. 28, 2008.
International Search Report for International Application No. PCT/IL07/00544 (now WO 2007/129313) (Yoelt) dated Jul. 7, 2008.
Written Opinion of the International Searching Authority in International Application No. PCT/IL07/00544 (now WO 2007/129313) (Yoeli) dated Jul. 7, 2008.
International Search Report for International Application No. PCT/IL0701465 (now WO 2008/065654) (Yoeli) dated Sep. 30, 2008.
Written Opinion of the International Searching Authority in International Application No. PCT/IL0701465 (now WO 2008/065654) (Yoeli) dated Sep. 30, 2008.
Written Opinion and Search Report of the International Searching Authority in International Application No. PCT/IL07/01475 (now WO 2008/065664 A2) (Yoeli) dated Sep. 2, 2008.
Corrected Written Opinion and Search Report of the International Searching Authority in International Application No. PCT/IL07/01475 (now WO 2008/065664 A2) (Yoeli) dated Jul. 27, 2009.
International Search Report for International Application No. PCT/IL08/00575 (now WO 2008/135973) (Yoeli) dated Oct. 28, 2008.

Written Opinion of the International Searching Authority in International Application No. PCT/IL08/00575 (now WO 2008/135973) (Yoeli) dated Oct. 28, 2008.
Written Opinion and International Search Report of the International Searching Authority in International Application No. PCT/IB08/055301 (now WO 2009/077968) (Yoeli) dated Aug. 14, 2009.
Written Opinion and International Search Report of the International Searching Authority in International Application No. PCT/IB09/052346 (Yoeli) (now WO2009-147630 A1) dated Oct. 20, 2009.
U.S. Appl. No. 10/523,609, (Yoeli) filed Feb. 7, 2005.
U.S. Appl. No. 10/987,321, (Yoeli) filed Nov. 15, 2004.
U.S. Appl. No. 11/061,652, (Yoeli) filed Feb. 22, 2005.
U.S. Appl. No. 11/411,243, (Yoeli) filed Apr. 26, 2006.
U.S. Appl. No. 11/447,311, (Yoeli) filed Jun. 6, 2006.
U.S. Appl. No. 11/405,003, (Yoeli) filed Apr. 17, 2006.
U.S. Appl. No. 11/794,906, (Yoeli) tiled Jul. 9, 2007.
U.S. Appl. No. 1/798,187, (Yoeli) filed May 10, 2007.
U.S. Appl. No. 11/826,202, (Yoeli) filed Jul. 12, 2007.
U.S. Appl. No. 11/892,414, (Yoeli) filed Aug. 22, 2007.
U.S. Appl. No. 12/224,549, (Yoeli) filed Nov. 4, 2008.
U.S. Appl. No. 12/226,952, (Yoeli) filed Feb. 27, 2009.
U.S. Appl. No. 12/516,257, (Yoeli) filed May 26, 2009.
U.S. Appl. No. 12/516,743, (Yoeli) filed May 28, 2009.
U.S. Appl. No. 12/598,514, (Yoeli) filed Nov. 2, 2009.

* cited by examiner

VTOL VEHICLE WITH COAXIALLY TILTED OR TILTABLE ROTORS

This application claims priority from U.S. Provisional Application Ser. No. 61/136,381 filed Sep. 2, 2008.

This invention relates to Vertical Take-Off and Landing (VTOL) vehicles generally, and specifically, to VTOL vehicles with rotors arranged in tandem that are fixedly tilted or adjustably tiltable to specified angles for lift-off, hover, and forward flight.

BACKGROUND

VTOL vehicles rely on direct thrust from propellers or rotors arranged to direct air flow downwardly for generating the lift forces necessary to lift the vehicle off the ground and to support the vehicle in a hover mode. Many different types of VTOL vehicles have been proposed where the weight of the vehicle in hover is carried directly by the rotors, with the axes of rotation of the rotors extending vertically, and substantially perpendicular to the ground. Some VTOL vehicles use propellers having their axes of rotation fully rotatable (up to 90° or so) with respect to the body of the vehicle. In vehicles of this kind, the rotors are arranged on wings on opposite sides of the fuselage (such as the V-22 Osprey), or in ducts supported on opposite sides of the fuselage (such as the Moller M400 Skycar), and the axes of rotation of the propellers are oriented substantially perpendicular to the ground for take-off hover and landing, and are tilted forward for normal, forward flight. Other vehicles use propellers having nearly horizontal axes of rotation, but include aerodynamic deflectors installed behind the propellers which deflect all or part of the flow downwardly to create direct upward lift for take-off.

In the Piasecki PA-59 (the "Flying Jeep"), the rearward of two coaxial ducted fans lying on the longitudinal axis of the vehicle, is fixed to the vehicle chassis at an angle relative to the vehicle's longitudinal axis to create both lift and forward thrust components. The forward ducted fan is also fixed to the chassis, but with its axis of rotation substantially perpendicular to the vehicle's longitudinal axis, and thus generating only lift forces while the chassis is horizontal.

In U.S. Pat. No. 5,454,531 (Melkuti), a ducted propeller aircraft is disclosed that includes a primary ducted propeller assembly centered beneath the cockpit, with left and right control ducted propellers in the aircraft wing sections. The ducted propeller assemblies are angularly fixed relative to the aircraft fuselage, i.e., the ducted propeller assemblies are fixed at an angle of about 22° relative to the fuselage in a horizontal orientation. Accordingly, in a horizontal flight mode, the ducted propeller assemblies are deployed at an angle of about 22° to horizontal (and to the incoming air streams), and exiting air is redirected to fully horizontal by a series of louvers to thereby produce forward thrust. For vertical flight, the aircraft fuselage is tilted upwardly such that the ducted propeller assemblies are substantially horizontal, and the louvers are adjusted to produce a substantially vertical thrust component.

In the past, vehicles with wing-supported, tiltable ducted fans, or VTOL vehicles with ducted fans supported directly on either side of the fuselage, have had a distinct disadvantage in terms of establishing a reduced profile or footprint for accessing confined areas. In addition, VTOL vehicles generally have been unable to generate a sufficiently high speed in forward flight for many applications.

There remains a need, therefore, for a VTOL craft or vehicle with a small lateral footprint or profile for accessing closely confined spaces, such as, for example, between tall buildings in a dense, urban environment and that also generates higher speed in forward flight.

BRIEF DESCRIPTION OF THE INVENTION

In accordance with an exemplary but non-limiting embodiment of the invention, there is provided a VTOL vehicle comprising a forward rotor, an aft rotor and a fuselage, the forward and aft rotor lying on a longitudinal axis of the vehicle, with the fuselage located axially between the forward and aft rotors, the vehicle having an in-flight configuration wherein the forward rotor is tilted downwardly at a negative tilt angle relative to the fuselage, and the aft rotor is tilted upwardly at a positive tilt angle relative to the fuselage.

In another aspect there is provided a VTOL vehicle comprising a forward rotor mounted in a forward duct, an aft rotor mounted in an aft duct, and a fuselage; the forward and aft rotors lying on a longitudinal axis of the vehicle, with the fuselage located axially between the forward and aft ducts, the forward and aft ducts pivotably mounted to the fuselage for movement from a first position where the forward and aft rotors lie in a common reference plane substantially parallel to the ground for lift-off and hover, to another position where the forward and aft rotors are tilted relative to the fuselage and the reference plane for forward flight, each of the forward and aft ducts provided with a plurality of adjustable control vanes extending across at least an inlet end thereof, the adjustable control vanes oriented substantially parallel to the longitudinal axis of the vehicle.

In still another aspect, there is provided a VTOL vehicle comprising a chassis supporting a forward rotor and an aft rotor in a fixed relationship to each other along a longitudinal axis of the vehicle, the rotors lying in different but substantially parallel planes; and a cockpit section mounted on the chassis for swiveling movement relative to the chassis, thereby enabling the cockpit section to be maintained in a horizontal orientation independent of the orientation of the chassis and the forward and aft rotors.

The exemplary embodiments will now be described in detail in connection with the drawing figures identified below.

DETAILED DESCRIPTION OF THE DRAWINGS

Figure 1:
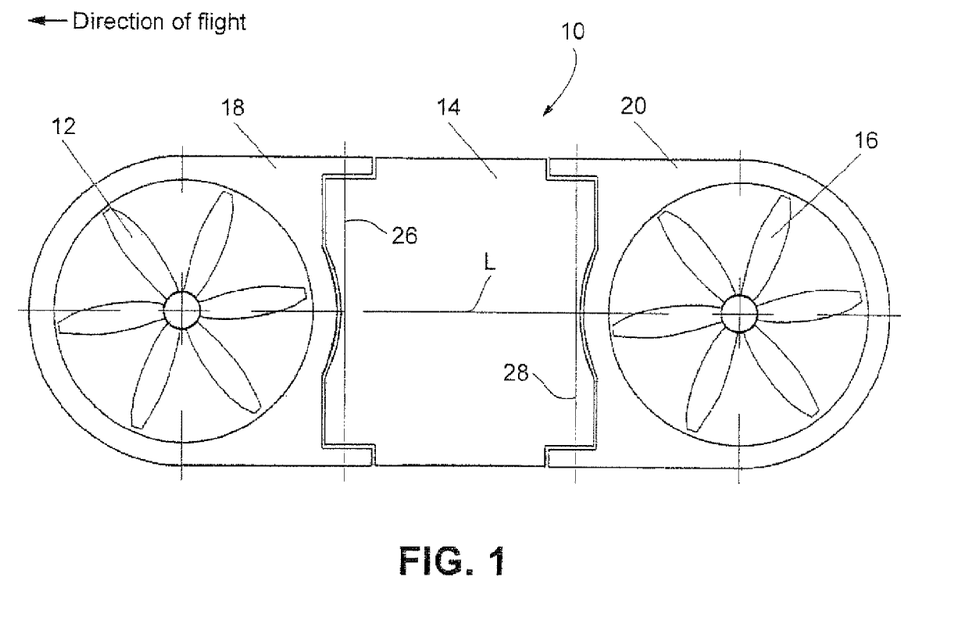
FIG. 1 is a schematic plan view of a VTOL vehicle in accordance with a first exemplary but non-limiting embodiment of the invention, showing a VTOL vehicle with forward and aft ducted rotors, with a payload bay or cockpit therebetween.
Figure 2:
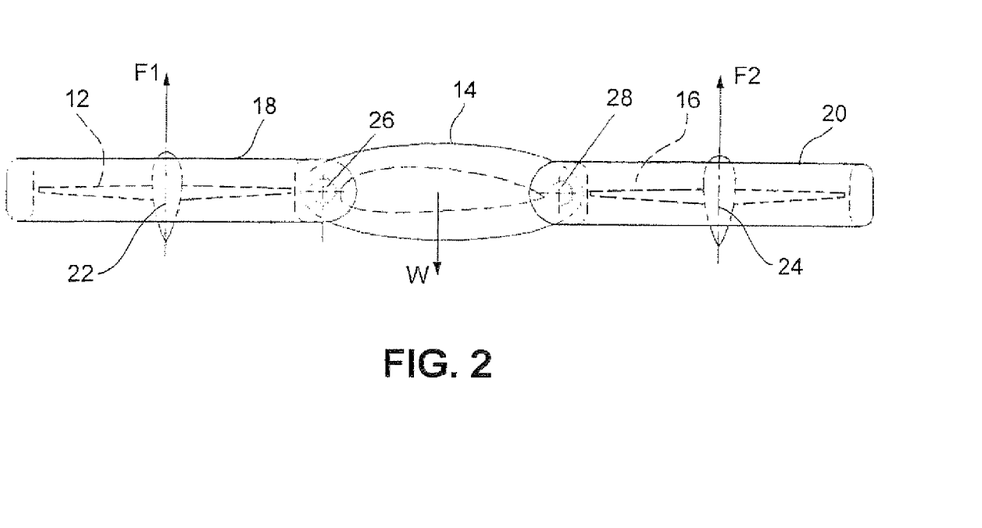
FIG. 2 is a schematic side view of the VTOL vehicle shown in FIG. 1, with the ducted rotors lying in a common, substantially horizontal plane containing the longitudinal axis of the vehicle, and with their respective axes of rotation substantially perpendicular to the ground.

Referring initially to FIGS. 1 and 2, an exemplary VTOL vehicle 10 is comprised of three principal components including a first forward rotor 12, a fuselage 14 (sometimes referred to herein as a chassis) and a second aft rotor 16. An engine (not shown) for driving the rotors is enclosed within the fuselage. Alternatively, for an electrically powered vehicle, for example, two separate engines may be mounted on (or close to) and drive each rotor separately. In this exemplary embodiment, rotors 12 and 16 are located within rotor ducts or housings 18 and 20, respectively, and are rotatable about axes of rotation 22, 24 respectively. Each rotor duct or housing is pivotably mounted to the fuselage for rotation about respective axially spaced pivots or hinges 26, 28. Note that the forward rotor 12 and associated forward duct 18, and the rearward or aft rotor 16 and associated rearward or aft duct 24, are aligned in tandem along the longitudinal center axis L of the vehicle, with the fuselage 14 located therebetween.

As best seen in FIG. 2, the rotor ducts or housings 18 and 20 lie in the same horizontal plane, with the axes of rotation 22, 24 arranged parallel to one another and perpendicular to that horizontal plane (and substantially perpendicular to the ground). Since the lift forces $F_1$ and $F_2$ generated by the rotors exceed the weight W of the vehicle 10 in this configuration, the VTOL vehicle 10 is able to lift off the ground and/or hover in flight.

Figure 3:
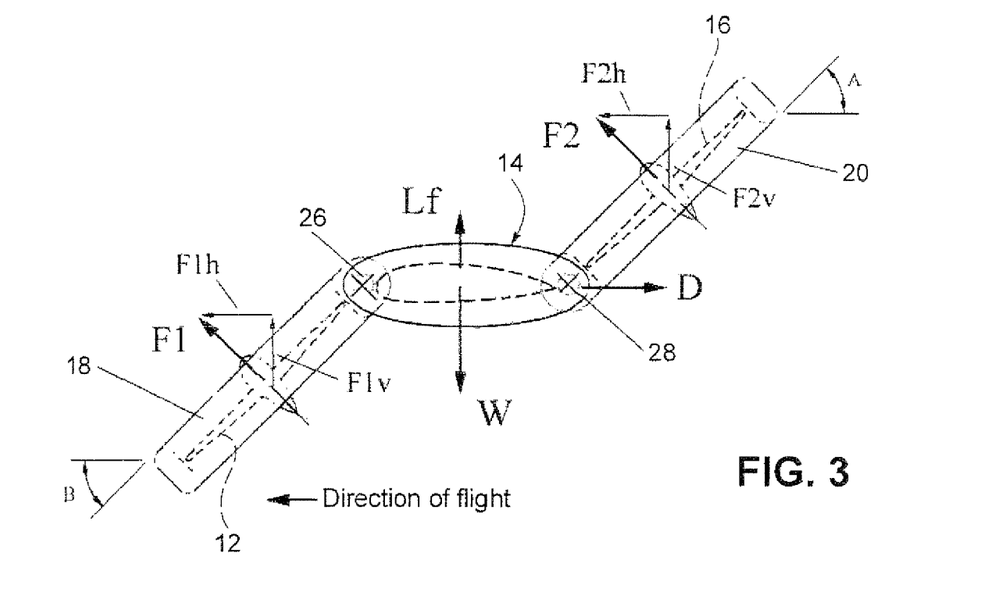
FIG. 3 is schematic side view similar to FIG. 2 but with the forward and aft rotors tilted in the same direction to acute negative and positive angles, respectively, of approximately 45° relative to the horizontal plane containing the longitudinal axis of the vehicle and to the ground.

To commence forward flight at a low or intermediate speed, and with reference especially to the vehicle orientation in FIG. 3, the aft rotor 16 and aft duct 20 are rotated upwardly about pivot axis 28 in a counterclockwise direction (as viewed in the Figure) to an angle A of between about 30° to about 60° relative to a substantially horizontal plane containing axis L (or to the fuselage generally), and forward rotor 12 and forward duct 18 are rotated downwardly about pivot axis 26 in the same counterclockwise direction to an angle B of about 30° to about 60°, also relative to that same plane or to the fuselage. For the sake of convenience and clarity, angle A achieved by reason of counterclockwise rotation angle of rotor 16 and duct 20 may be regarded as a "positive" angle, and the angle B achieved by reason of counterclockwise rotation of the forward rotor 12 and forward duct 18 may be regarded as a "negative" angle insofar as the respective angles lie above and below the horizontal reference plane containing the axis L (or the fuselage generally). In this configuration, rotor-generated forces F1 and F2 include vertical lift force components $F_{1V}$ and $F_{2V}$ greater than the weight W of the vehicle, and horizontal thrust components $F_{1h}$ and $F_{2h}$ greater than the drag force D. An additional lift force $L_f$ is generated by the aerodynamically shaped fuselage 14.

Figure 4:
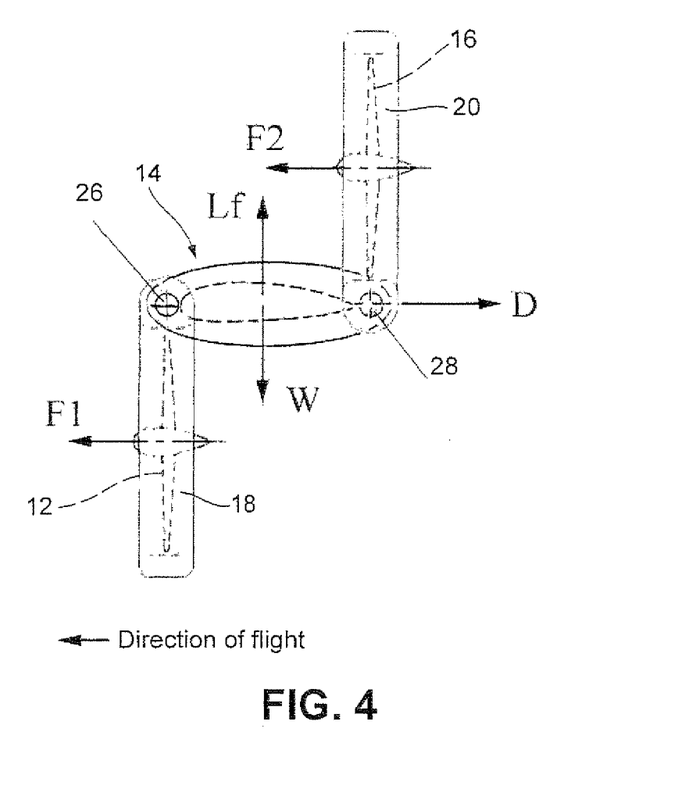
FIG. 4 is a schematic side view similar to FIG. 3, but with the rotors tilted further to substantially 90°.

For even faster forward flight the forward and aft rotors/ducts may be rotated further in the same direction, such that positive and negative angles A and B are increased to substantially 90° as shown in FIG. 4. Now, all of the forces generated by the rotors 12 and 16 are thrust or forward flight forces F1 and F2, and lift forces $L_f$ are generated by the aerodynamically shaped fuselage (and possibly also by aerodynamically-shaped surfaces on upper and lower horizontal sections of the duct walls).

It will be appreciated that angles A and B may be substantially identical positive and negative angles, respectively, as shown, or alternatively, the rotor ducts may be rotated differentially. For example, angle A may be a positive angle between about 30° and about 90° while angle B could be zero or any angle greater than zero, up to about 90°. It will also be appreciated that the vehicle's flight control system may be utilized to tilt the fuselage to a desired angle relative to horizontal, after the rotor angles A and B have been set.

Figure 5:
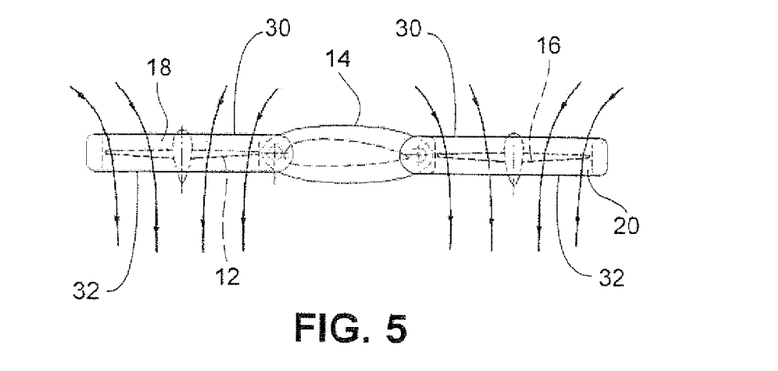
FIGS. 5, 6 and 7 are schematic side views similar to FIGS. 2-4, respectively, but showing how the tandem arrangement of rotors facilitates uninterrupted airflow through the ducted rotors in pure hover, intermediate and pure forward flight modes, with no blockage or interference by the fuselage to the airflow into either of the rotors.
Figure 6:
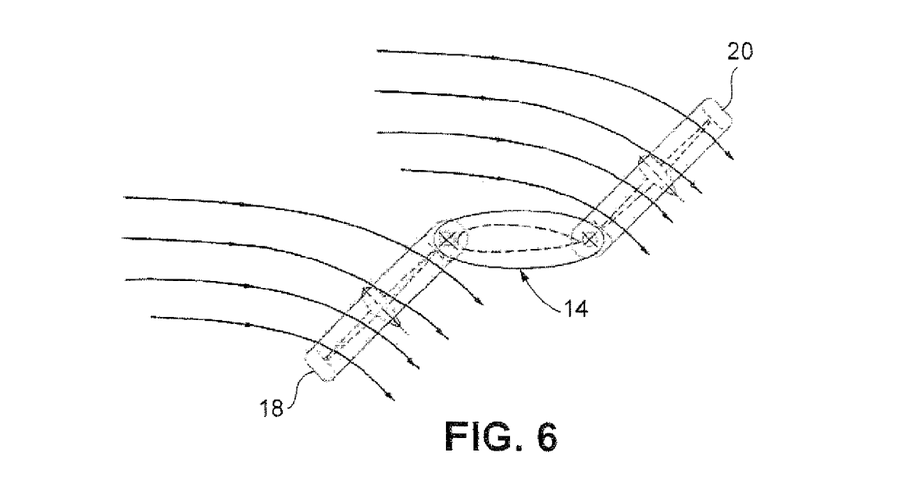
Figure 7:
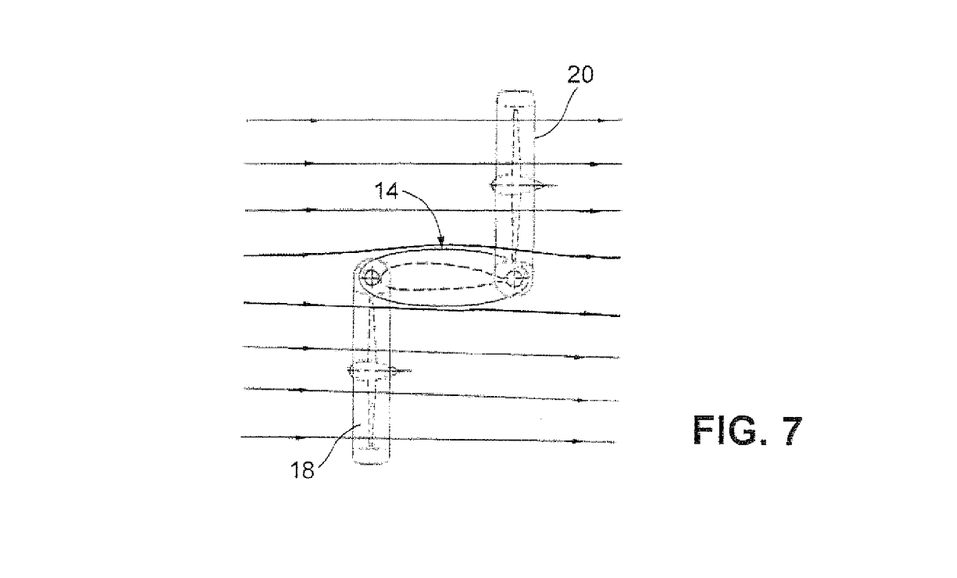

As will be appreciated from FIGS. 5-7, the rotor ducts or housings 18, 20 have inlets 30 at their upper ends and outlets 32 at their lower ends (considering the orientation of the rotor ducts in FIG. 5). Note that the vehicle configuration including the aerodynamic shape of the fuselage 14, enables substantially unimpeded flow of air through the rotor ducts or housings 18, 20 regardless of the orientation of those ducts or housings relative to the fuselage 14. For a more detailed discussion of airflow around the fuselage and through the ducts, see commonly-owned International Publication No. WO 2007/052271 A2.

Figure 8:
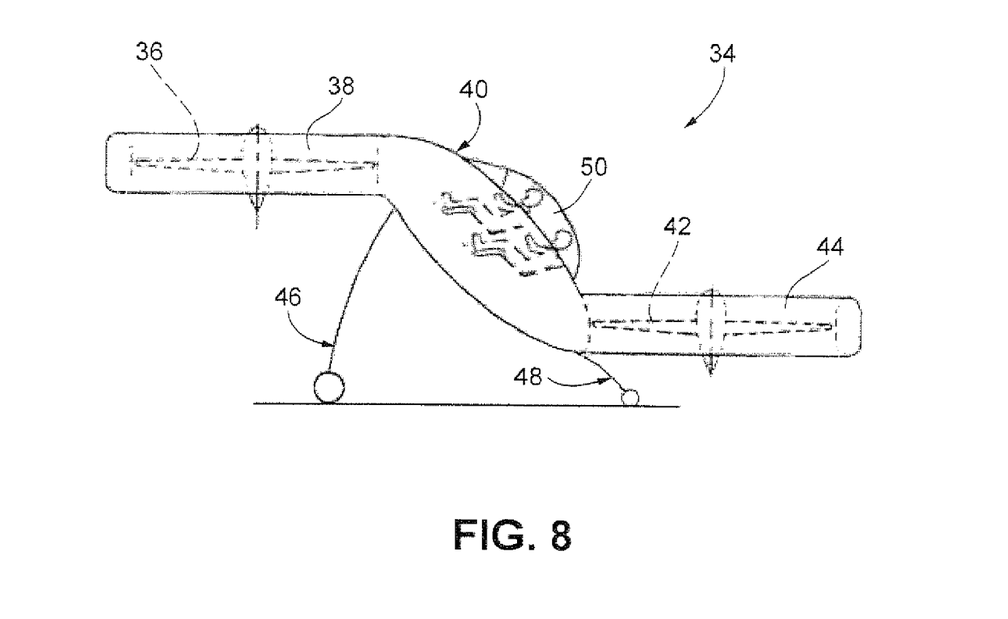
FIGS. 8 and 9 are schematic side views of another exemplary but non-limiting embodiment of a ducted rotor VTOL vehicle on the ground and in forward flight, where the forward and aft rotors are fixed at negative and positive angles, respectively, of substantially 45° relative to the vehicle fuselage.
Figure 9:
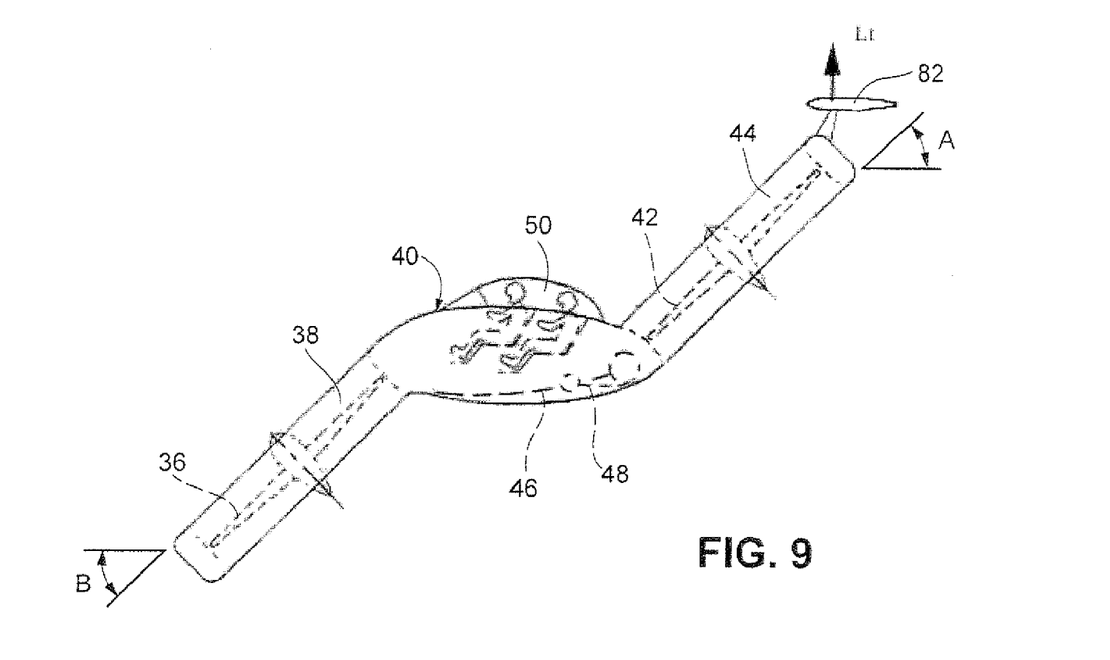
Figures 10, 11:
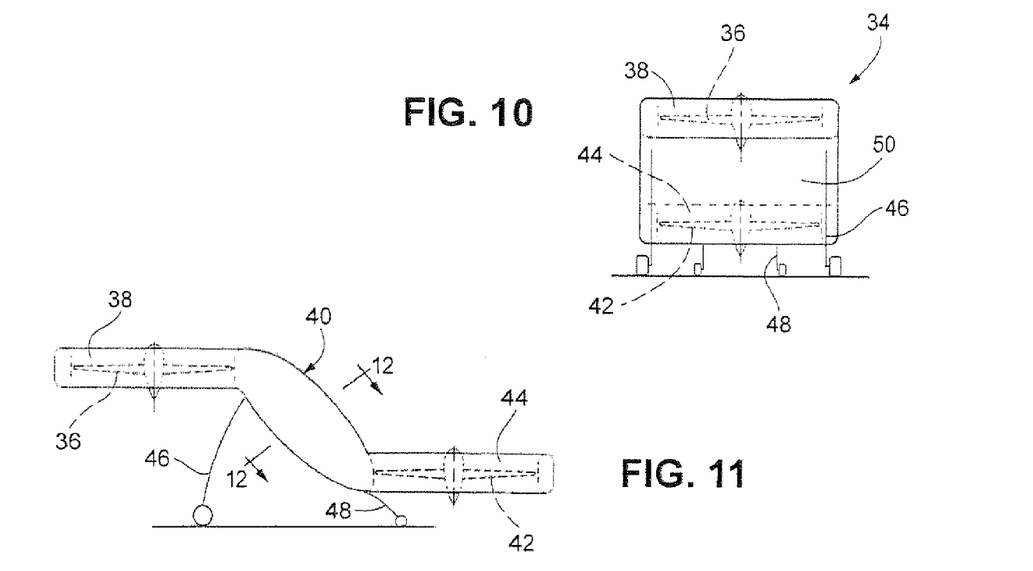
FIG. 10 is a schematic front end view of the vehicle in FIG. 8.
FIG. 11 is a schematic side view similar to FIG. 8, but in an unmanned configuration.

FIGS. 8-10 illustrate another embodiment of a VTOL vehicle 34 in accordance with an exemplary but non-limiting implementation of the invention. The VTOL vehicle 34 again has three primary components, the forward rotor 36 and associated forward duct (or housing) 38, the fuselage 40 and the rearward rotor 42 and associated duct (or housing) 44. As in the previously described embodiments, the rotors/ducts and fuselage are aligned along a longitudinal axis of the vehicle (see axis L in FIG. 1).

In this embodiment, the ducts 38 and 44 (and hence rotors 36 and 42) are secured to the fuselage 40 at the same fixed, in-flight positive and negative angles A and B shown in FIG. 3. When at rest, the vehicle 34 is oriented with ducts 38 and 44 substantially horizontal (i.e., parallel to ground), with the fuselage 40 tilted at an angle of about 45° relative to the ground (or to the vertically spaced, horizontal planes containing the rotors 36, 42). The fixed tilt angle may, however, be larger than shown, and up to 75° or so depending on application and other design factors. Landing gear struts 46, 48 (which may be retractable), are configured and arranged to permit the vehicle to be oriented in this manner when the vehicle is on the ground, as best seen in FIG. 8. This orientation, where the rotors generate only forces only in an upward direction, facilitates both lift-off and landing of the vehicle as well as flight in the hover mode. FIG. 10 shows more clearly how the forward and aft rotors lie in vertically-spaced and substantially horizontal planes when the vehicle is on the ground.

After lifting off, the orientation of the craft 34 can be altered through differential pitch change of the rotors 36, 42, causing the vehicle to tilt forward to bring the fuselage 40 to a substantially horizontal orientation (FIG. 9). The fixed rotors/ducts are now arranged at positive and negative A and B angles of about 45° (see FIG. 3), so that both lift and thrust force components are generated by the rotors 36, 42. Note, however, that if the fuselage is not aerodynamically shaped, the lift forces will be generated only by the ducted rotors 36, 42.

Figures 12, 13, 14:
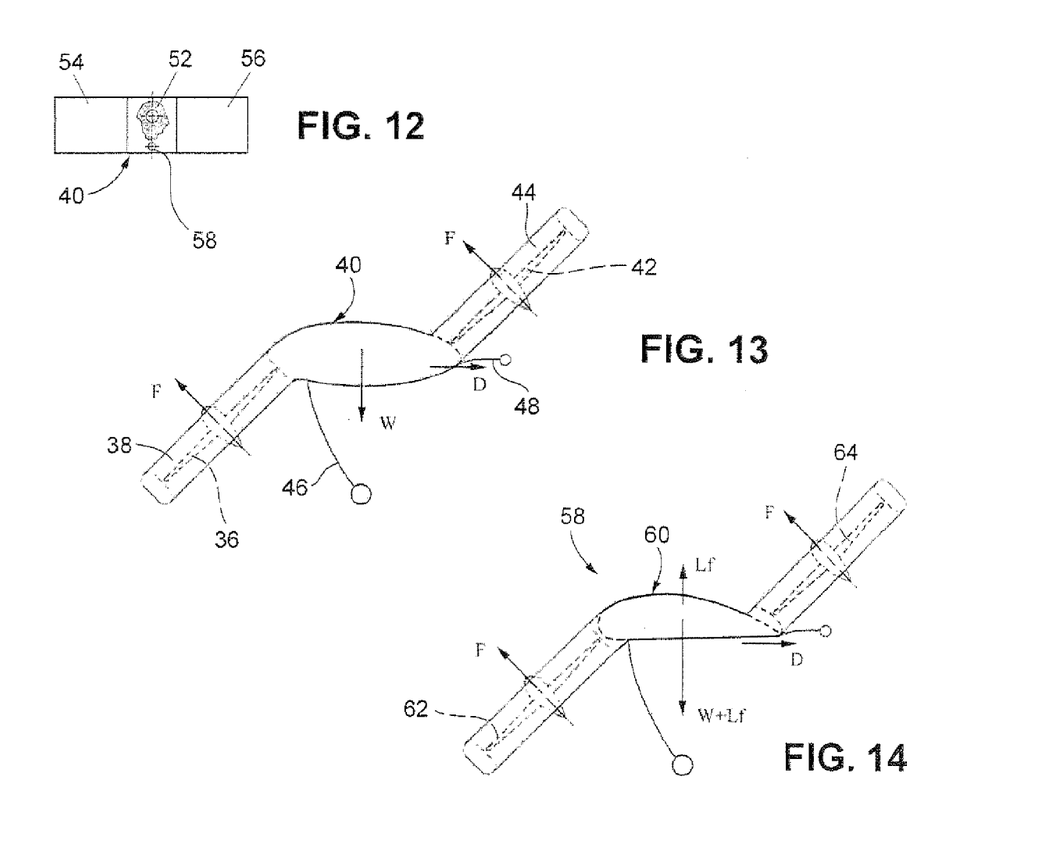
FIG. 12 is a section view taken along the line 12-12 in FIG. 11.
FIG. 13 is a schematic side view of the vehicle shown in FIG. 11, but tilted for forward flight.
FIG. 14 is a schematic side view of a VTOL vehicle in accordance with another exemplary but nonlimiting embodiment where the fuselage is aerodynamically shaped to generate additional lift forces.

FIGS. 11 and 13 illustrate an unmanned version of the vehicle 34, thereby eliminating the need for the cockpit 50 shown in FIGS. 8 and 9. The configuration may otherwise be substantially identical to the embodiment shown in FIGS. 8-10. FIG. 12, which is section 12-12 of FIG. 11, schematically illustrates one example of how the vehicle engine 52 may be housed in the fuselage 40, with payload bays 54, 56 (for cargo, instrumentation, etc.) located on either side of the engine 52. Drive shafts (one shown at 58) may extend from opposite ends of the engine, with suitable couplings connecting the drive shafts to other shafts connected to the rotors via suitable gearboxes.

In a variation shown in FIG. 14, a VTOL vehicle 58 includes a fuselage 60 that is aerodynamically shaped, thus generating a lift force $L_f$ supplementing the vertical components of the forces generated by the rotors 62, 64. Otherwise, the vehicle is substantially identical to the vehicle illustrated in FIGS. 8-13. It is envisioned that with unmanned vehicles such as those shown in FIGS. 1-14, higher tilt angles would be utilized, since no consideration need be given to the comfort of occupants in the highly-tilted fuselage while the vehicle is in hover or on the ground.

Figure 15:
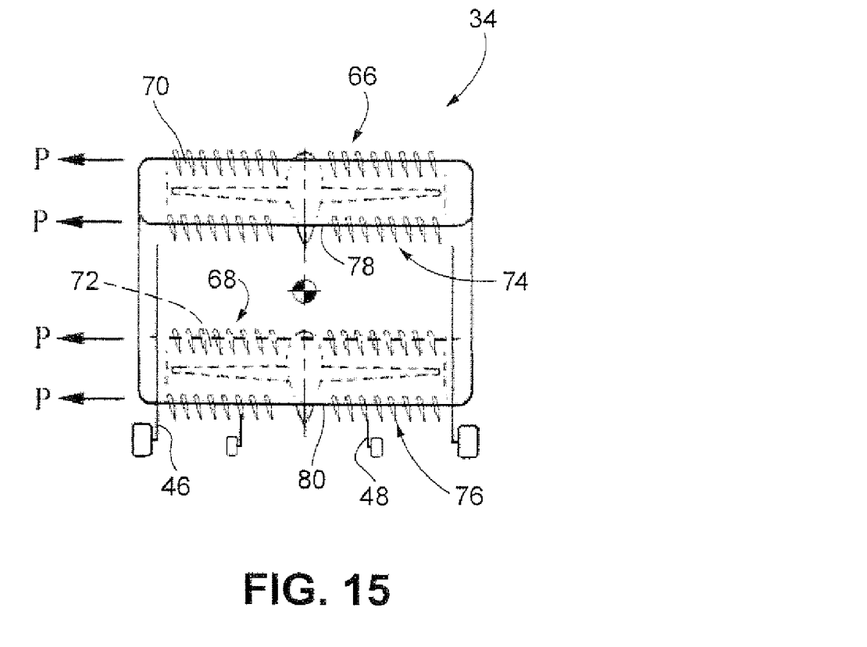
FIGS. 15 and 16 are schematic front end views similar to FIG. 10 but also showing different orientations of control vanes located at the inlets and outlets of the rotor ducts.

Control of the ducted rotor VTOL vehicles described above in flight may be effected primarily through the use of groups of adjustable control vanes arranged at the inlets and, optionally, at the outlets of the rotor ducts or housings (omitted from the previously described figures for clarity). Specifically with reference to FIGS. 15 and 16, vehicle 34 is shown with control vanes 66, 68 located at the inlets 70, 72 to the forward and aft ducts, respectively, and outlet vanes 74, 76 located across the outlets 78, 80 of the forward and aft ducts, respectively. The control vanes are oriented substantially parallel to the vehicle longitudinal axis L (FIG. 1). Movement of the vehicle is typically considered with reference to one or more of six degrees of freedom (or motion), i.e., along X, Y and Z axes, as well as in pitch, roll and yaw angles. Forward movement along the X-axis is controlled by thrust force components generated by the tilted rotors (see FIGS. 3 and 4, for example). Lateral movement along the Y-axis is controlled by rotation of some or all of the inlet and outlet vanes 66, 68, 70 and 72 in the same direction, as shown in FIG. 15, establishing uniformly directed side forces P. Movement along the vertical Z-axis is controlled by lift force components generated by the rotors through rpm or rotor blade pitch change.

Figure 16:
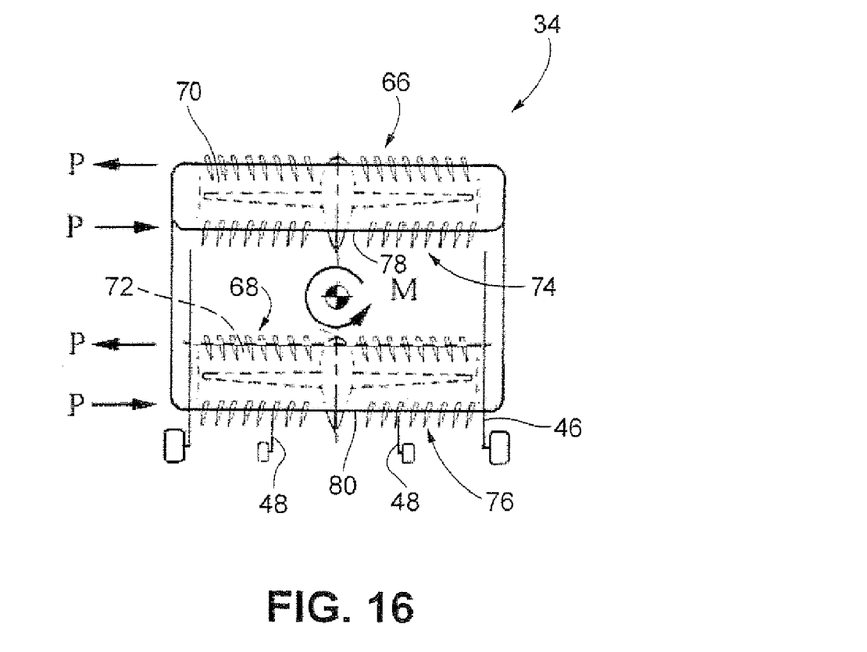

Pitch angular movement is controlled by differential thrust in the fore and aft rotors. Roll movement is controlled by cyclic control of the rotor blades or by adjusting the control vanes in the inlets and outlets in opposite directions as shown in FIG. 16, to thereby establish oppositely directed side forces P at each duct causing rolling motion of the vehicle about the vehicle center axis. (For an unducted rotor vehicle, roll is achieved by rotor blade cyclic control). Yaw movement is controlled by differential side forces on the forward and aft ducts via rotation of the control vanes in the inlets, outlets or both, for example, inlet and outlet vanes in the forward duct rotated in one direction, and the inlet and outlet vanes in the aft duct rotated in an opposite direction.

Additional control elements may be employed if desired. For example, FIG. 9 illustrates the use of a flap or stabilizer 82 extending laterally across the aft duct 44 for augmenting pitch trim of the vehicle in flight and enhancing its maneuverability. A similar stabilizer could be employed at the forward duct if desired. Similarly-configured vertical stabilizers or other control surfaces could also be employed. In addition, other control vane arrangements, for example, radially-oriented vanes could be used, although less preferred.

Figure 17:
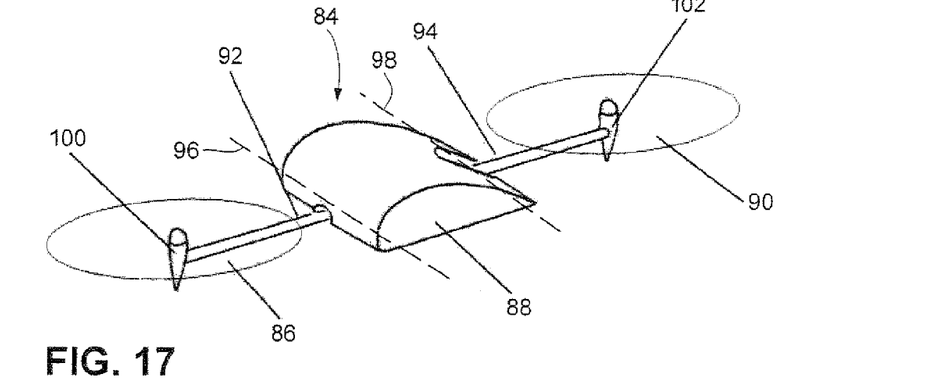
FIGS. 17-19 show schematic perspective views of a VTOL vehicle in accordance with another exemplary but nonlimiting embodiment of the invention, where the rotors are not enclosed in ducts, but are tiltable similar to the ducted rotors of FIGS. 1-4.
Figure 18:
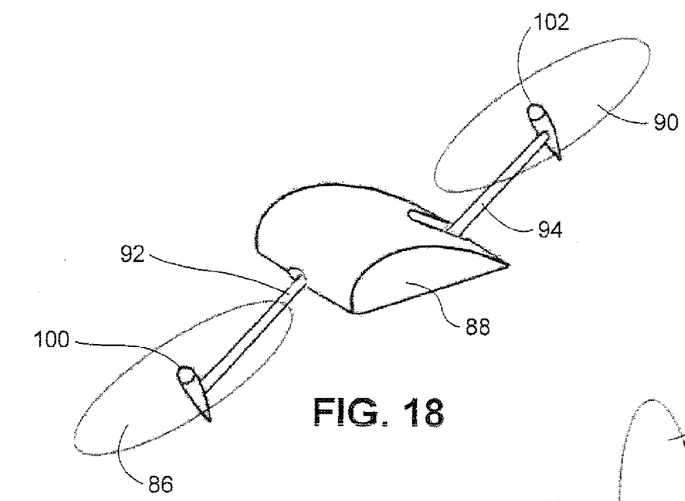
Figure 19:
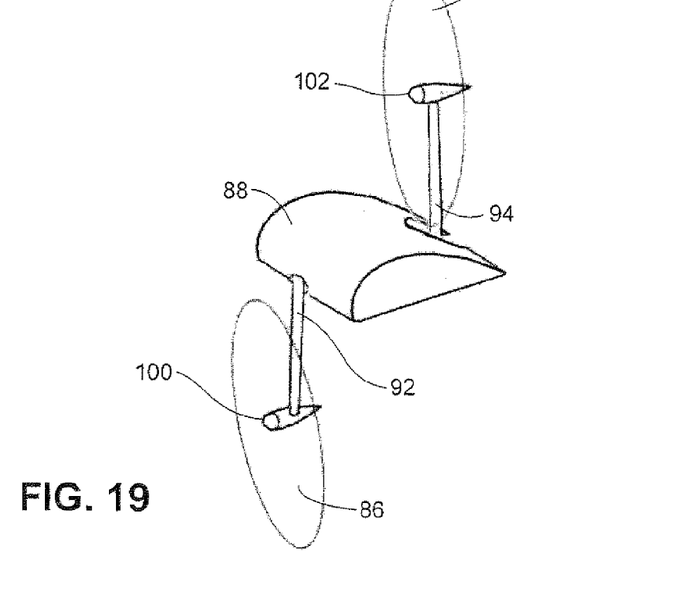

While the VTOL vehicles illustrated in FIGS. 1-16 are shown to include rotor ducts or housings, the VTOL vehicle may be configured without ducts as shown in FIGS. 17-19. In this embodiment, the VTOL vehicle 84 includes a forward unducted rotor 86 (represented by a circle of rotation generated by the rotor), a fuselage 88 and an unducted aft rotor 90 (similarly represented). Here, the rotors 86 and 90 are supported on hollow pylons 92, 94, respectively, each of which is pivotably mounted to the fuselage 88 for rotation about respective horizontal axes 96, 98. The pylons enclose necessary power transmission elements such as shafts, electrical cables, hydraulic lines, etc. for connection to the gearboxes and/or motors that power the rotors mounted inside the rotor hubs 100, 102. FIG. 17 shows the rotors 86, 90 with their axes of rotation (represented by hubs 100, 102) perpendicular to the ground such that the rotors generate only vertical lifting forces. FIG. 18 shows the rotors tilted to intermediate positive and negative angles similar to the configuration of the ducted rotors in FIG. 3 for example. FIG. 19 illustrates the rotors pivoted to positive A and B angles of substantially 90° similar to the vehicle in FIG. 4, for fast forward flight.

Other configurations are contemplated where the rotors are arranged within partial ducts (e.g., half-circle ducts, etc.) with or without control vanes as described above.

For vehicles with unducted rotors, some degree of protection may be provided for the rotor blades, including partial enclosures, cages or the like that have only a protection function. Since no control vanes are available in this embodiment, control of the vehicle is effected by rotor tilt and by cyclic control of the blades of the rotors.

Figure 20:
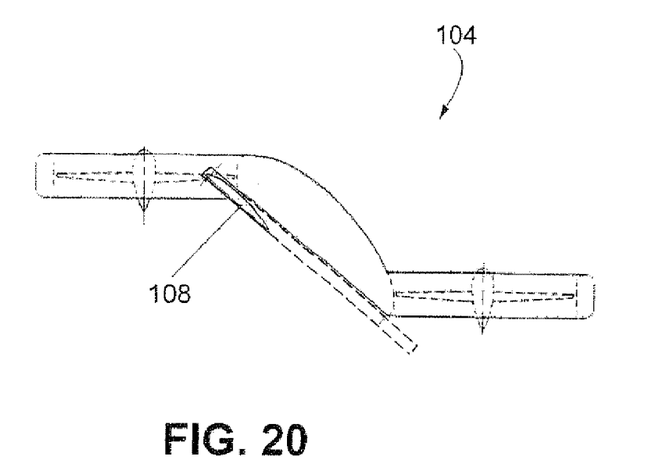
FIG. 20 is a schematic side view of a VTOL vehicle in accordance with another exemplary embodiment of the invention, incorporating deployable wings.
Figure 21:
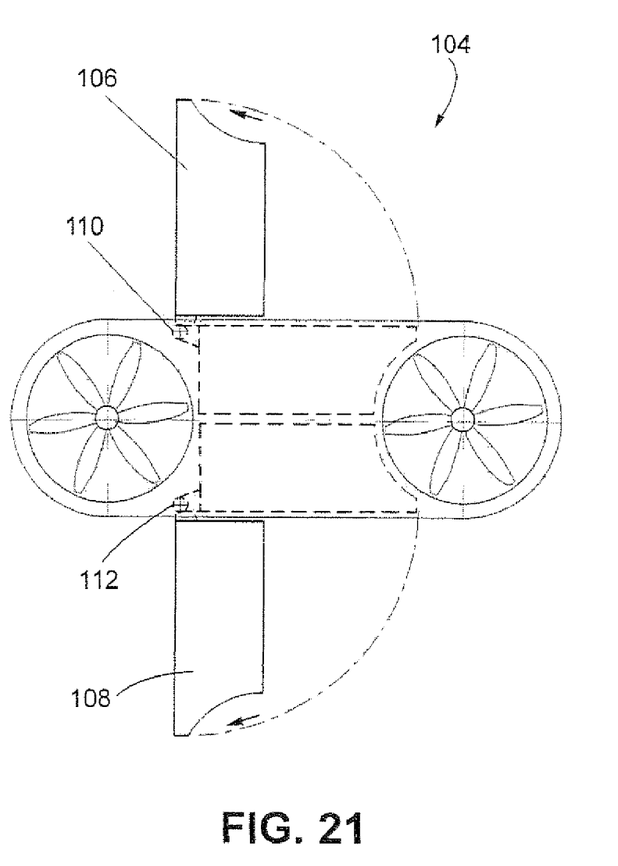
FIG. 21 is a plan view of the vehicle in FIG. 20.

FIGS. 20 and 21 illustrate another embodiment of a VTOL vehicle 104 incorporating a pair of wings 106, 108 moveable from a stowed or retracted position (shown in phantom) to a fully deployed position. The wings may be pivotably mounted to the fuselage at pivots or hinges 110, 112 such that when stowed, the wings lie along the lower side of the fuselage (or within slots formed in the fuselage). Deployment of the wings 106, 108 by electric or hydraulic actuators (not shown) in forward flight generates additional lift forces while improving cruise efficiency.

Figures 22, 23, 24:
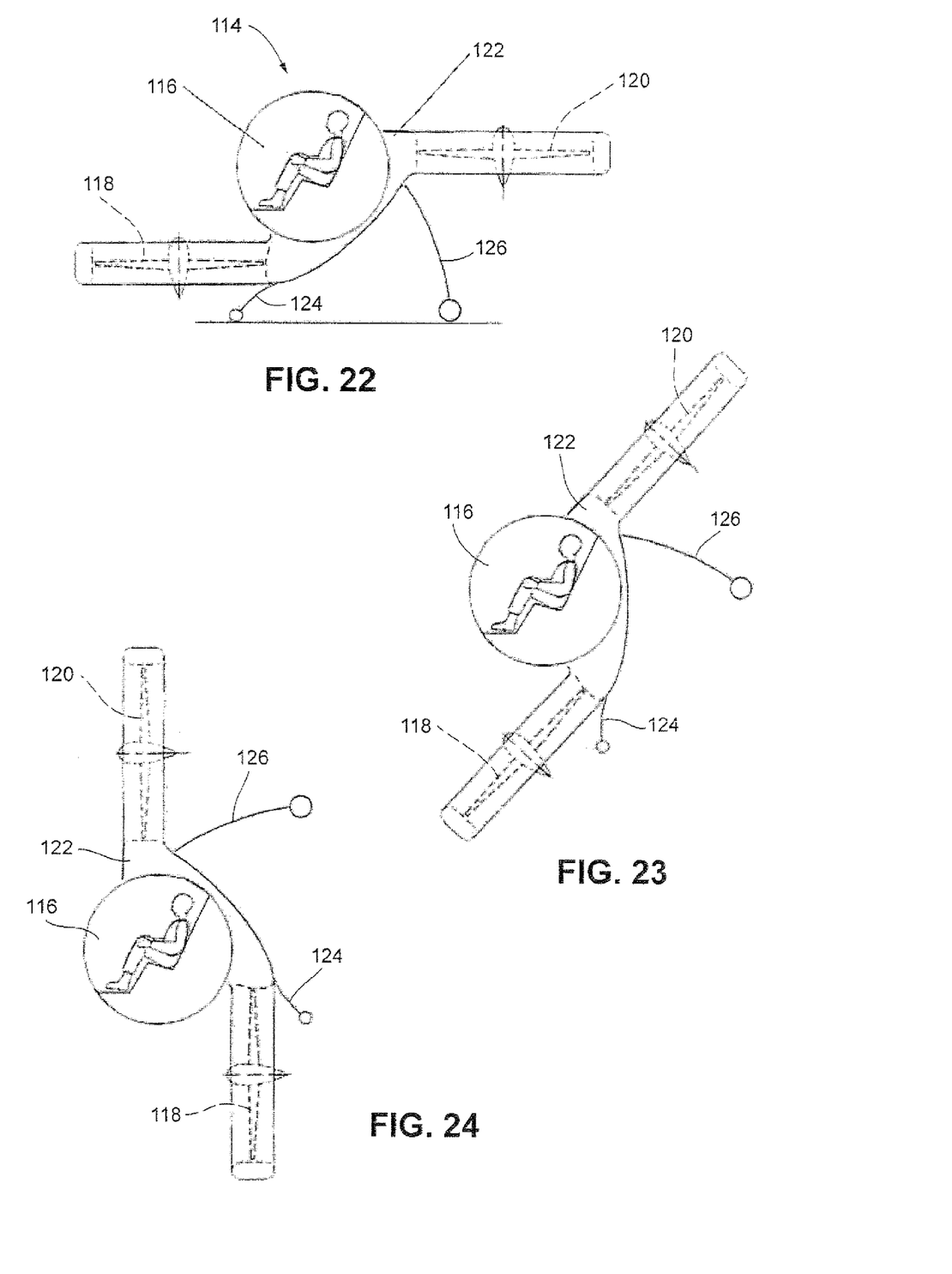
FIG. 22 is a schematic side elevation of a VTOL vehicle in accordance with another exemplary but nonlimiting embodiment of the invention, where forward and aft ducted rotors are fixed relative to each other but rotatable together relative to a cockpit located axially between the rotors.
FIG. 23 is a schematic side view of the vehicle of FIG. 22 but with the rotors rotated to an intermediate forward flight position.
FIG. 24 is a schematic side view of the vehicle of FIG. 22, but with the rotors rotated substantially 90° to a pure forward flight position.

FIGS. 22 through 25 illustrate in simplified form a VTOL vehicle 114 in accordance with another exemplary but non-limiting embodiment of the invention. In this embodiment, the cockpit 116 is designed to swivel or rotate about a horizontal axis thus permitting the ducted rotors 118, 120, which are in a fixed substantially parallel orientation relative to each other, to rotate relative to the cockpit 116 to different lift-off and forward flight positions, while allowing the occupants to remain in a horizontal orientation. More specifically, the cockpit 116 is supported on the vehicle chassis 122 by means of bearings or sliders that permit relative swiveling motion between the cockpit and the chassis. FIG. 22 shows the vehicle on the ground, in position for lift-off, with the chassis 122 oriented such that the ducted rotors 118, 120 are substantially parallel to the ground (and hence with axes of rotation substantially perpendicular to the ground), and with the cockpit 116 in a substantially horizontal orientation. Landing gear components 124, 126 are mounted to the chassis and are arranged to support the vehicle in the orientation shown in FIG. 22. The landing gear components may be fixed or retractable into the fuselage as desired.

FIG. 23 shows the vehicle 114 in an in-flight orientation, with the chassis 122 rotated relative to the cockpit 116, to achieve identical negative and positive angles of substantially 45° for the rotors 118, 120, respectively. Thus the pilot and other occupants (if any), or other payload (luggage, for example) are able to maintain the same orientation relative to ground as at lift-off. This is an intermediate flight speed orientation where the forces generated by the rotors 118, 120 contain both lift and thrust components.

FIG. 24 shows the vehicle 114 with the chassis 122 rotated further relative to the cockpit 116 to a high speed flight orientation. Here, the rotors 118, 120 have been rotated to produce positive and negative angles, respectively, of substantially 90°, such that the rotors generate pure thrust forces. It will be appreciated that in the orientation shown in FIG. 24, there must be some means for generating lift. This may be accomplished by limiting the tilt of the rotors to less than 90°, thereby retaining a vertical component of their thrust to support the vehicle's weight, aerodynamic shaping of at least some part of the upper portion of the cockpit, chassis, or both, or by incorporating deployable wings as shown in FIGS. 20 and 21.

Figure 28:
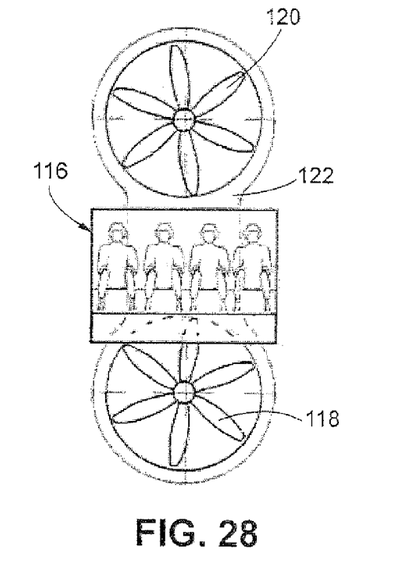
FIG. 28 is a schematic front view of a VTOL vehicle in pure forward flight as shown in FIG. 27.

FIGS. 25-28 illustrate additional details relating to the vehicle 114 shown in FIGS. 22-24, and also illustrate some additional, optional features. For example, the cockpit 116 may be formed to include fairing 128 to reduce drag and to provide additional compartments 130 for luggage, cargo, etc. A wide slot 132 is formed in the inner portion of the fairing to allow the chassis 122 to rotate between the various positions described above. As best seen in FIG. 28, the cockpit 116 may be increased in width to extend laterally beyond the sides of the chassis 122 to accommodate additional occupant seating or payload.

Figure 25:
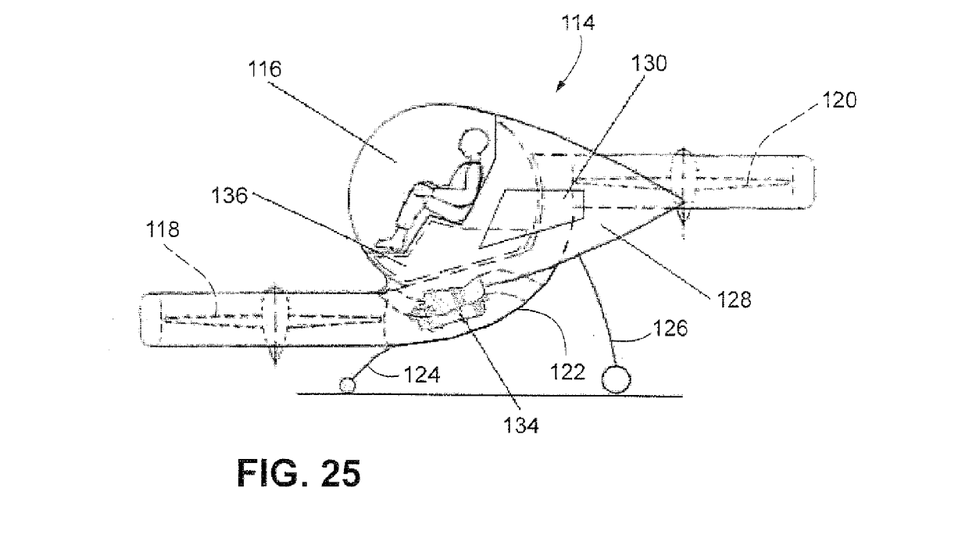
FIGS. 25 is a schematic side elevation of a VTOL vehicle similar to that shown in FIG. 22, but with a modified cockpit configuration.
Figure 26:
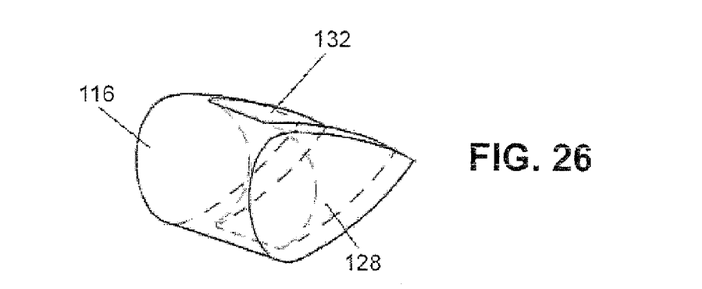
FIG. 26 is a perspective view of the cockpit taken from FIG. 25.
Figure 27:
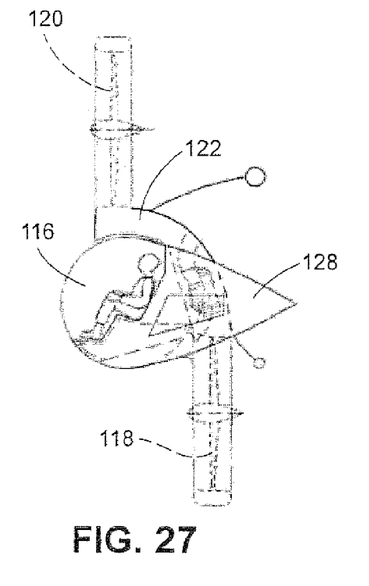
FIG. 27 is a side elevation of the vehicle shown in FIG. 25 but with the rotors tilted or rotated substantially 90° to a pure forward flight position.

The engine 134 is shown in FIG. 25 mounted below the swiveling cockpit 116, attached to the chassis 122. Power may be transmitted from the engine to the rotors via a mechanical power distribution system, i.e., gearboxes and shafts. A fuel tank 136 is shown optionally mounted below the occupants seating area but within the swiveling cockpit structure, feeding fuel to the engine through flexible fuel lines. This arrangement is advantageous in that the fuel tank remains substantially horizontal, and thus able to continue to supply fuel to the engine without any special provisions while the chassis 122 rotates. Other power and power transmission configurations are within the scope of this invention.

The vehicle 114 shown in FIGS. 22-28 could also employ one or more stabilizing or auxiliary lifting surfaces, such as the stabilizer 82 shown in FIG. 9, and may also incorporate the control vane structure shown in FIGS. 15 and 16. Vehicle 114 could also feature unducted rotors as shown in FIGS. 17-19.

Figure 29:
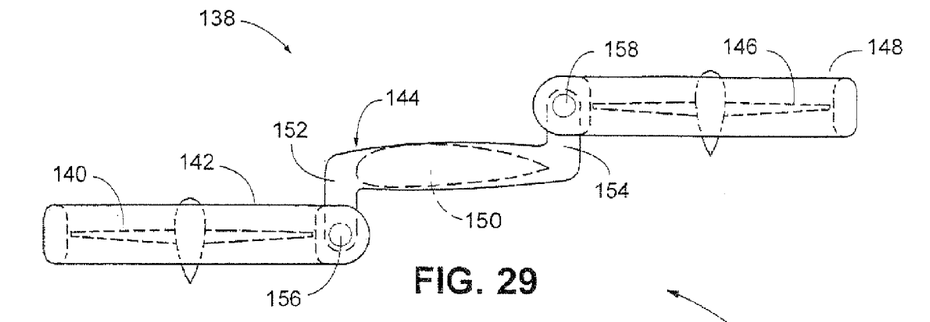
FIGS. 29-31 show schematic views of a VTOL vehicle similar to FIGS. 1-3, but with offset pivots allowing a greater range of motion of the rotors relative to the fuselage or chassis.
Figure 30:
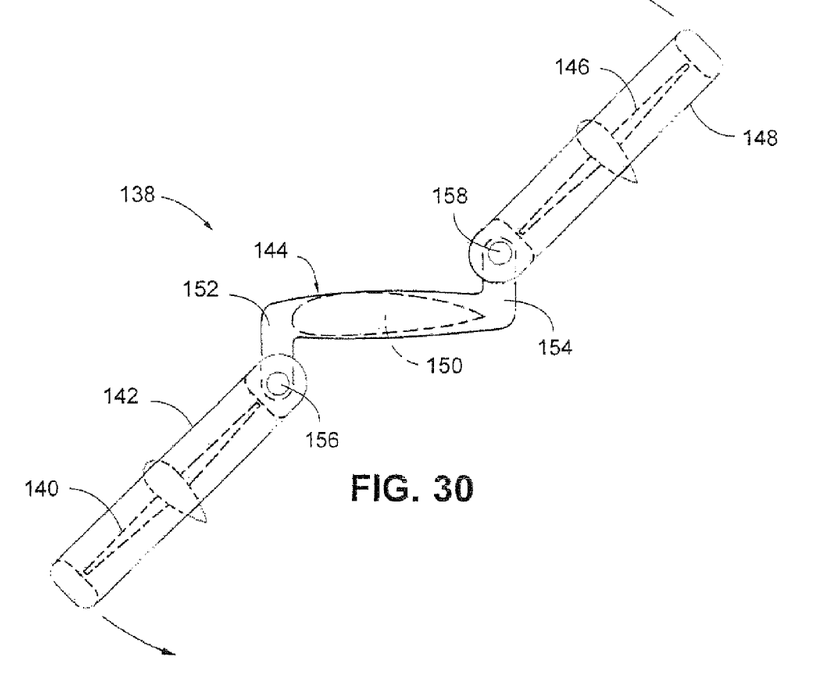
Figure 31:
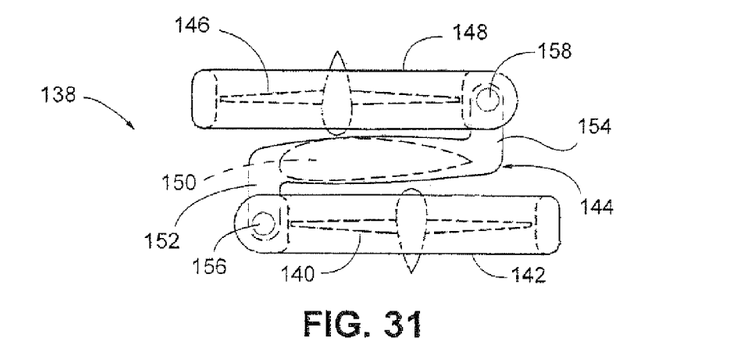

FIGS. 29-31 illustrate schematically a variation of the embodiment shown in FIGS. 1-4. Specifically, the VTOL vehicle 138 includes a forward rotor 140 enclosed within a duct 142, a fuselage (or chassis) 144 and an aft rotor 146 enclosed within an aft duct 148. The chassis may be formed with a centrally arranged and aerodynamically shaped portion 150 (which may or may not include a cockpit). The chassis is also formed with forward and aft offsets 152, 154, respectively, on both sides of the center portion 150, through which pivot pins 156, 158 extend, and by which the ducts/rotors are hinged to the fuselage. The forward and aft ducts 142 and 148 are pivotable from the lift-off and hover orientation of FIG. 28 to the intermediate forward flight position of FIG. 30 (as well as the pure forward flight position as shown in FIG. 4). Advantageously, the offset pivot arrangement also allows each of the forward and aft ducts to be pivoted substantially 180° to the fully collapsed position shown in FIG. 31, where the forward duct, chassis and aft duct are substantially vertically stacked. This compact configuration allows the VTOL vehicle to be stowed, shipped in a cargo aircraft, ship, etc. or otherwise transported easily and efficiently. For example, in a "miniaturized" version, an electrically powered VTOL vehicle may be carried on a small vehicle or even by backpack. It will be appreciated that this collapsibility feature is also applicable to an unducted VTOL vehicle of the type shown in FIGS. 17-19. There are also alternative arrangements to facilitate the offset hinges, such as having the center section straight while the duct/rotor sections are provided with suitable offsets or, alternatively, by employing additional links between both ducts/rotors and the center section—all to facilitate complete folding and stacking of the three sections as shown in FIG. 31.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A VTOL vehicle comprising a pivotably mounted forward rotor, a pivotably mounted aft rotor and a fuselage, the forward and aft rotors secured to said fuselage and lying on a longitudinal axis of the vehicle, with the fuselage located axially between the forward and aft rotors, the vehicle having an in-flight configuration wherein the forward rotor is tilted downwardly about a pivot axis located at an aft end of the forward rotor at a negative tilt angle relative to said fuselage, and the aft rotor is tilted upwardly about a pivot axis located at a forward end of the aft rotor at a positive tilt angle relative to said fuselage.

2. The VTOL vehicle of claim 1 wherein said forward and aft rotor are pivotably mounted for enabling individually selected positive and negative angles of between 0° and about 90° relative to said fuselage.

3. The VTOL vehicle of claim 1 wherein said forward and aft rotors are mounted in open-ended ducts.

4. The VTOL vehicle of claim 3 wherein each open-ended duct is provided with a first plurality of adjustable control vanes extending across at least an inlet end of each said duct, said first plurality of adjustable control vanes oriented substantially parallel to said longitudinal axis of the vehicle.

5. The VTOL vehicle of claim 4 wherein each open-ended duct is provided with a second plurality of adjustable control vanes extending across an outlet end of each said duct, said second plurality of adjustable control vanes oriented substantially parallel to said longitudinal axis of the vehicle.

6. The VTOL vehicle of claim 1 wherein said forward rotor and said aft rotor are tilted through substantially identical negative and positive tilt angles, respectively.

7. The VTOL vehicle of claim 1 wherein said fuselage is aerodynamically shaped so as to generate lift when in forward flight.

8. A VTOL vehicle comprising a forward rotor mounted in a forward duct, an aft rotor mounted in an aft duct, and a fuselage; the forward and aft rotors lying on a longitudinal axis of the vehicle, with the fuselage located axially between the forward and aft ducts, said forward and aft ducts pivotably mounted to said fuselage at respective pivot axes located at an aft end of said forward duct and a forward end of said aft duct, respectively, for movement from a first position where said forward and aft rotors lie in a common reference plane substantially parallel to the ground for lift-off and hover, to another position where said forward and aft rotors are tilted relative to said fuselage and said reference plane for forward flight, each of said forward and aft ducts provided with a plurality of adjustable control vanes extending across at least an inlet end thereof, said adjustable control vanes oriented substantially parallel to said longitudinal axis of the vehicle.

9. The VTOL vehicle of claim 8 wherein in said another position, said forward and aft ducts and said forward and aft rotors are tilted at positive and negative angles, respectively, relative to said fuselage, in a range of from about 30° to about 90°.

* * * * *